United States Patent [19]
deCarmo et al.

[11] Patent Number: 6,065,006
[45] Date of Patent: May 16, 2000

[54] DVD SYSTEM FOR SEAMLESS TRANSFER BETWEEN TITLES ON A DVD DISC WHICH MINIMIZES MEMORY CONSUMPTION

[75] Inventors: Linden A. deCarmo, Plantation; Amir M. Mobini, Delray Beach, both of Fla.

[73] Assignee: Oak Technology, Inc., Sunnyvale, Calif.

[21] Appl. No.: 09/019,017

[22] Filed: Feb. 5, 1998

[51] Int. Cl.[7] .............................. G06F 12/00; G06F 13/00
[52] U.S. Cl. ................................ 707/7; 707/200; 711/113; 711/160; 369/30; 369/47; 369/275.3; 369/178
[58] Field of Search .................................... 707/200, 206, 707/7; 711/113, 160; 369/30, 47, 178, 275.3

[56] References Cited

U.S. PATENT DOCUMENTS

| | | | |
|---|---|---|---|
| 5,448,473 | 9/1995 | Takeuchi et al. | 707/500 |
| 5,481,509 | 1/1996 | Knowles | 369/30 |
| 5,485,442 | 1/1996 | Furukawa et al. | 369/47 |
| 5,617,384 | 4/1997 | Yonemitsu et al. | 369/32 |
| 5,689,484 | 11/1997 | Hirasawa | 369/33 |
| 5,691,972 | 11/1997 | Tsuga et al. | 369/275.3 |

*Primary Examiner*—Jean R. Homere
*Attorney, Agent, or Firm*—Kudirka & Jobse, LLP

[57] ABSTRACT

The set up information associated with at least some of a DVD disc's titles are stored in a DVD player's local memory. Items are chosen for storage based upon the likelihood that a title will be played. The likelihood that a title will be played is balanced against the availability of local memory for storing this information. Titles are ranked according to the likelihood they might be played and titles of lower rank may be purged from the local memory, or title cache, set aside for this task. Six basic criteria are used to rank a title as extremely likely, highly likely, likely, or not likely to be played. A title ranked extremely likely to be played has top caching priority, one that is highly likely to be played has the second highest caching priority, and so on. Each time a title's set up information is read, the title is ranked for caching. Additionally, the state of the title cache is stored every time a user plays a DVD. As a result, an initial caching list based on previous usage patterns is established. Items in the initial cache retain the criteria weighting earned in a previous playback session. Title information is retrieved from the title cache for rapid playback when a DVD player transfers from playback of one title to another.

18 Claims, 5 Drawing Sheets

DVD SYSTEM FOR SEAMLESS TRANSFER BETWEEN TITLES ON A DVD DISC WHICH MINIMIZES MEMORY CONSUMPTION

FIELD OF THE INVENTION

This invention relates generally to improvements in digital versatile disc systems and, more particularly, to improved transfer among titles in a digital versatile disc system.

BACKGROUND OF THE INVENTION

Digital versatile discs (DVDs) are information storage devices used for storing prerecorded audio information, movies and computer software. The storage and playback mechanism used in DVDs closely resembles the mechanism used in compact discs (CDS) and DVD players use the same laser technology as CD players. Briefly, both DVDs and CDS store information as a pattern of pits formed in a metallic substrate. The pit patterns form digital words and can be read by shining a laser beam on the disc surface and detecting the reflected beam. However, the information storage capacity of a typical DVD is much higher than that of a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies will soon be available which use single or double sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. DVDs, however can store information in several formats. For example, DVDs which are used to store video information (hereinafter called DVD-VIDEO discs) may use various known information compression algorithms, such as MPEG-2 for video compression/decompression. A DVD may also include high fidelity sound data. In addition, a DVD may also store uncompressed linear pulse code modulated data streams which have sample rates between 48–90 kHz and are sampled at 16 or 24 bits. Still other DVD versions (hereinafter called DVD-ROM discs) can store digital data for computer use, and the data may also be compressed on these discs.

Although DVD-ROM and DVD-VIDEO discs share compression algorithms, the data format on DVD-VIDEO discs is significantly different than the data format found on DVD-ROM discs. One important difference is that the data content on DVD-ROM is platform-specific, while DVD-VIDEO discs operate with a platform independent navigation engine for playing interactive movies. The files on the DVD-VIDEO disc may be referenced in predetermined directory structure.

In particular, each DVD-VIDEO disc typically contains a main directory denoted as a VIDEO_TS directory which contains two types of files distinguished with the file extensions .IFO and .VOB. During playback, these files are sorted by a DVD video player to form video "title" sets, which are groupings of all files necessary to play a particular DVD video "title", for example, a movie. Each video title set is composed of one .IFO file and one or more .VOB files.

A file with the .VOB extension contains the actual multimedia data and is called a video object set. The location and format of the multimedia data stored in the video object set is defined by the associated .IFO file. In particular, .IFO files contain navigational data structures and a processor-independent interpreted language which specifies how the data structures are arranged.

The data structures themselves are composed of various objects called "program chain objects", "program objects", and "cell objects". Program chain objects link related program objects (or particular scenes) within a title and their data structures govern the playback of the program objects. For example, a simple title may contain only one program chain. However, complex titles may contain two or more program chains to allow random access to a variety of programs. The multiple program chain title can play programs linearly, randomly or in a "shuffle" mode.

Each program object in a program chain is composed of elements called "cell objects". These objects instruct a DVD player as to which portion of the multimedia data in one of the .VOB files to decode. In particular, the data structures in a cell object are defined in the .IFO file and the multimedia content is found in one of the .VOB files. Each cell object directs the DVD player to begin playback at a specific location in the .VOB file which is referred to as a video object unit or "VOBU". A VOBU is a container object that includes navigational data as well as multimedia data.

Navigational input can also be obtained directly from a user by means of navigational buttons which are displayed under playback program control on screen along with the multimedia data. The playback program controls both the time duration that the button appears on the screen and the manner that the system responds to the selection of a button by a user. For example, user selection of a button may cause the playback program to jump to a new location on the disc and begin playback at the new location.

The specific navigational commands which are recognized by a DVD player are controlled by a device independent language and a set of DVD player parameters which define the current state of the DVD player. These navigational commands can be broken into several categories including the following: Set, SetSystem, GoTo, Link, Jump and Compare.

Set commands permit primitive operations, such as compare or assignment operations, to manipulate the values of selected stored parameters. SetSystem commands are used to set the internal system parameters of the player. GoTo commands are used to skip to a specific instruction number in the instruction stream and Link and Jump commands cause program execution to jump to various locations within a title or menu on the disc. Finally, Compare commands allow value testing on either a system or user parameter.

The aforementioned DVD navigation commands provide an efficient way to move to different locations on a DVD disc, under program control. Unfortunately, switching titles, more specifically, switching between the playback of program data associated with one title and the playback of program data associated with another title, is typically not a seamless operation. The process of setting up a title's program data for playback requires a DVD player to read setup information associated with a title, such as may be stored in the .IFO files, verify the information, and then proceed with displaying multimedia information, or the program data itself. That is, the setup information is read from the DVD disc, copy protection authentication is performed, the data's validity is checked, and objects are created to process the .IFO and .VOB data related to the title. Should a user wish to transfer from one title, that is, from playback of the program data contained within one .VOB file, to another, the user generally must wait for these operations to take place before playback can proceed to the next requested title. While it is conceivable that the set up data for all titles on a DVD disc could be stored within a player's local memory, thereby increasing the speed with which the title set up data could be read and verified, memory requirements render this approach impractical and cost-prohibitive. A DVD playback apparatus and method which increase the speed with which title playback may be transferred, without requiring the volumes of local memory necessary for storing all the DVD discs title set up information and objects would, therefore, be highly desirable.

SUMMARY OF THE INVENTION

The foregoing need is satisfied in one embodiment of the present invention, in which the set up information and objects associated with some of a DVD's titles are stored in a DVD player's local memory. Title information is chosen for storage based upon the likelihood that a title will be played. More specifically, the storage choice is based upon the likelihood that the program data associated with a title and is typically contained within a .VOB object, will be played. In this manner, set up information and objects related to titles that are likely to be played will be readily accessible to a player and, at the same time, a player's relatively high-speed storage will not be over-burdened with information and objects related to titles that are not likely to be played. The likelihood that a title will be played is balanced against the availability of local memory for storing this information.

In accordance with the principles of the present invention, titles are ranked according to the likelihood they might be played and titles of lower rank may be purged from the local memory set aside for this task, referred to hereinafter as the "title cache". In the illustrative embodiment, six criteria are used to rank a title as extremely likely, highly likely, likely, or not likely to be played. A title ranked extremely likely to be played has top caching priority, one that is highly likely to be played has the second highest caching priority, and so on.

If a title has been played more than a threshold number of times in a playback session, or if the title has been specifically requested by a user, the title is given the highest likelihood of playback ranking, i.e., "extremely likely". Title usage information is stored by a DVD player, which may be a component of a computer system, for example, in order to determine a specific title's popularity. If a title is the target of a potential branch, or if a title is "distant" from previously played titles, the title is given the second highest ranking, i.e., "highly likely". If DVD highlight information, information employed to list title options to a user, indicates that a title is the subject of a user option, that title is given the third highest ranking, that of "likely".

Each time a title's set up information is read, the title is ranked for caching, as set forth above. A title's information is stored, or cached, if there is sufficient storage area within the title cache after title information related to titles of lower priority is removed. In the illustrative embodiment, title information is only removed from the cache should a title of either the highest or second highest priority ranking require storage and title information of a lower ranking occupies space in the cache. The amount of local memory set aside for title caching may be adjusted, thereby permitting a greater or lesser number of titles to be stored. Additionally, the state of the title cache is stored every time a user plays a DVD disc. As a result, an initial caching list based on previous usage patterns is established. Items in the initial cache retain the criteria weighting earned in a previous playback session. However, in the illustrative embodiment, ranking information is related to a specific user, through a log-in mechanism for example, so that rankings related to a present user will not be overridden by rankings from a previous user.

BRIEF DESCRIPTION OF THE DRAWINGS

The above and other features, objects and advantages of the invention will be better understood by referring to the following detailed description in conjunction with the accompanying drawing in which.

DETAILED DESCRIPTION

Figure 1:
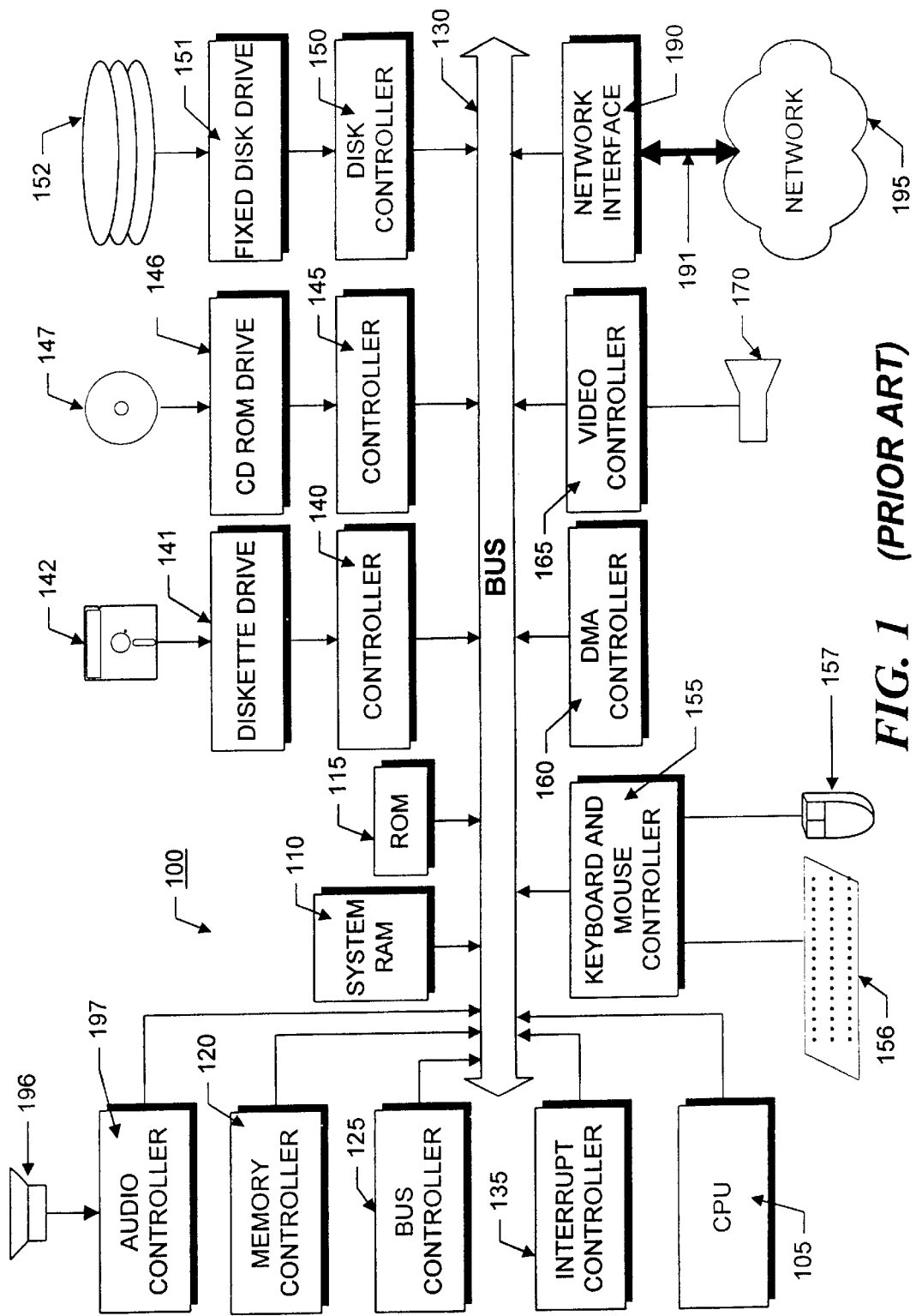
FIG. 1 is a block diagram of a conventional computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disc 152 is part of a fixed disc drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and 1/0 services, among things. In particular, an operating system 20 resident in system memory and running on CPU 105 coordinates the operation of the other elements of computer system 100. The present invention may be implemented with any number of commercially available operating systems including OS/2, UNIX and DOS, etc. One or more applications 202 such as Lotus Notes, commercially available from Lotus Development Corp., Cambridge, Mass. If operating system 200 is a true multitasking operating system, such as OS/2, multiple applications may execute simultaneously.

Figure 2:
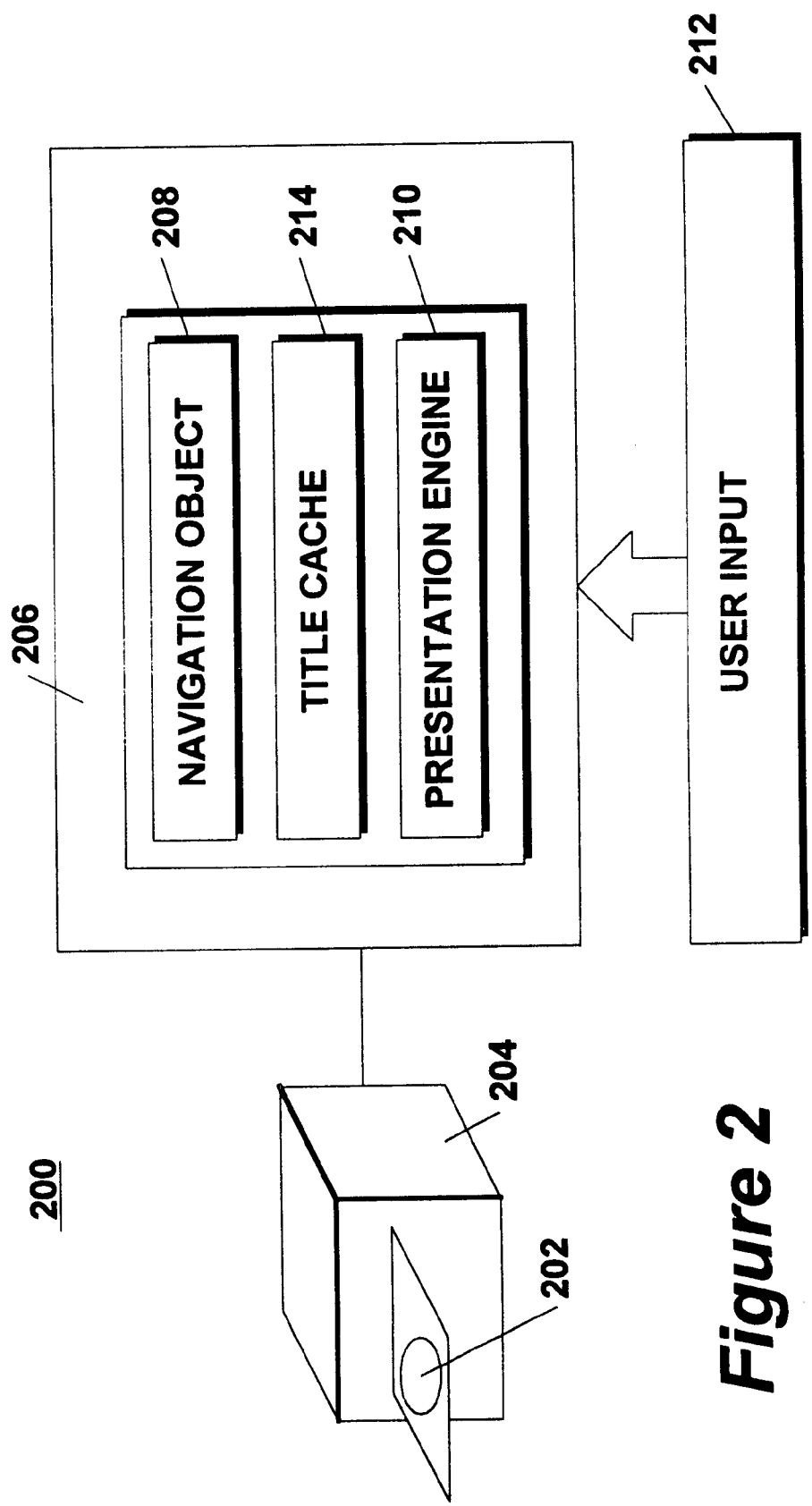
FIG. 2 is a conceptual diagram of the elements comprising a DVD system including a DVD drive and an accompanying computer with software components installed therein.

FIG. 2 illustrates conceptually the main components of a system 200 in accordance with the present invention. FIG. 2 shows a DVD-ROM drive 204 connected to a computer 206 such as the computer system 100 of FIG. 1. Use of the DVD-ROM drive 204 with the computer 206 should not be construed as a limitation of the invention, however, since other DVD systems, such as a DVD-VIDEO systems, may be used with many other types of multimedia devices, including television systems. In addition, the DVD-ROM drive 204 may also be a drive suitable for internal mounting in computer 206.

The DVD drive 204 receives a disc 202 containing compressed and encoded information which has been coded in accordance with the DVD 1.0 Specification for read-only discs. Disc 202 may contain up to seventeen gigabytes of information. The computer 206 includes a device driver (not shown) for enabling the operating system in the computer 206 to control and exchange information with the drive 204. The computer 206 also includes one or more input devices 212 which receive input from a user.

The computer 206 also includes a control and playback program shown schematically in FIG. 2 as having a navigation object 208 with logic for reading data from the drive. A presentation engine 210 includes decompressing and decoding routines for decoding the information from the disc 202 and routines for formatting the information for display. For example, the audio information may be compressed by means of conventional compression technique known as Dolby® AC-3® compression (also known as "Dolby® Digital" decompression), and video information may be compressed using a compression technique known as MPEG-2 (Moving Picture Experts Group-2).

In the illustrative embodiment, the software elements of system 200 are implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programing techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Referring again to FIG. 2, DVD ROM playback system 200 includes local memory, such as the system RAM 110 of FIG. 1. Whenever a DVD title is read, for example, by a computer such as computer 206, DVD title information, including title setup information and objects required to display associated .VOB files, is stored in a relatively high speed data storage area, such as that provided by the system RAM 110. After ranking the likelihood that the associated title may be played again, as will be discussed in greater detail in relation to FIGS. 3 and 4, the title information is either stored in an area of RAM 110 set aside for title information or, if the title is unlikely to be played again, the title information is discarded after the associated title is played. The area of RAM set aside for storage of title information will be referred to as title cache 207. Each time a title is played, the DVD player increments or decrements a counter, or employs a similar mechanism, to determine whether the title has been played frequently enough to warrant assigning the highest likelihood of playback ranking to the title. Once developed, during a DVD playback session, title rankings are preferably stored in a nonvolatile storage medium, such as discs 152, of FIG. 1. In this way, title rankings may be used to establish an initial ranking whenever a DVD disc is replayed. Alternatively, the title-ranking information could be stored in volatile storage, such as that provided by system RAM 110, with the ranking information being re-used only so long as the playback system remains powered. These initial rankings may be modified during disc playback to reflect changes in title preferences.

In the illustrative embodiment, title rankings may be associated with a particular user, for example, through means of a log-in mechanism and a user identification profile. In this way, title rankings associated with one user, one DVD disc, and one playback session will not affect another user using the same DVD disc in a subsequent playback session. Additionally, should a user wish to establish new title rankings, the log-in mechanism may be used to alter, or basically reset, the title rankings associated with a DVD disc the user has previously played. That is, the user may wish to override title rankings associated with his prior use of the DVD disc, and the log-in mechanism allows him to do so. The DVD playback system employs the title rankings to determine whether a specific title's information is to be stored within the title cache 207, with information related to higher-ranked titles generally displacing information related to lower-ranked titles.

When a DVD disc is played, the DVD playback system 206 initializes its title cache 207, based on previous usage of this particular DVD disc. If no rankings are available for the DVD disc, that is, if the present user has not played this DVD disc before, or an indication has been made to the player that the user prefers to establish new title rankings, no rankings will be available to the player, and titles will be stored in the title cache 207 according to the rankings they receive as the titles are read by the DVD player. The title-ranking and storage processes are set forth in greater detail in relation to FIGS. 3, 4, and 5 below. When a title is read, its set up information is checked for validity and, if this data is valid, objects are created, according to the title's set up information, to process the title's .VOB data. The title's set-up information is then ranked according to the likelihood that the title will be played again. The title set up information and objects created to process the title's .VOB data are then stored within the cache 207 if the title's ranking is sufficiently high and there is sufficient room in the title cache 207. If there is not enough room in the title cache 207, title information related to lower-ranked titles is removed to make room for the present title's information, in the event the present title is given a highest or second-highest likelihood of playback ranking.

Figure 3:
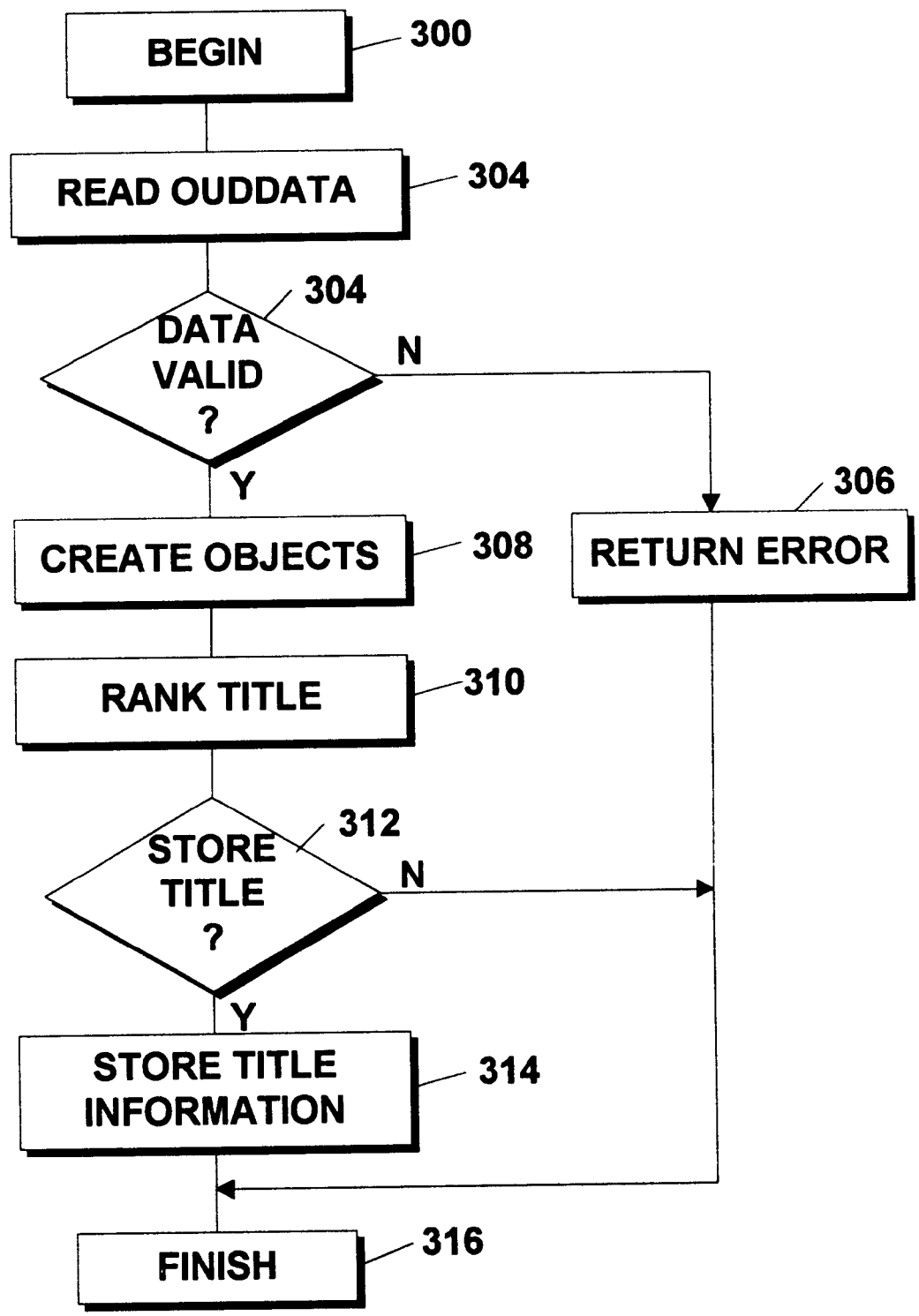
FIG. 3 is flowchart that illustrates the reading and storing of DVD title data, including the ranking of titles and the storing of related title information, in accordance with the principles of the invention.

The process of reading DVD titles, prioritizing titles, and storing title data is set forth, generally, in the flow diagram of FIG. 3. A DVD disc player may begin the process of FIG. 3, for example, after receiving a user's request to play the DVD program data and information associated with a specific DVD title. It is assumed that the title cache 207 has been initialized prior to entering the process described in relation to FIG. 3. The title cache may be initialized, when the disc is first inserted in the playback system for example, using title rankings established in the present user's previous playback session. That is, the playback system may read title information from the DVD disc and store it in the title cache 207 according to title rankings established in the current user's prior DVD disc playback session. If previous playback rankings are not to be employed, the title cache 207 is initialized to be empty and any previous rankings are over-written.

The process of reading, ranking and caching title information begins in step 300 and proceeds to step 302, where a DVD disc's title's information is read into local memory. After reading the DVD disc's title data, the process proceeds to step 304 where the DVD playback system determines whether or not the data is valid. If the data is not valid, the process proceeds to step 306, where an error is returned. The error may be employed by the DVD player in a number of ways. For example, the player may display an error message to a user in response to an error returned in step 306. From step 306 the process proceeds to finish in step 316.

On the other hand, if, in step 304, the playback system 200 determines that the title data is valid, the process proceeds to step 308, where the playback system 200 creates the objects which process data, such as that contained in a .VOB file, related to the title. From step 308, the process proceeds to step 310, where titles are ranked according to the likelihood that they would be replayed. The ranking process is discussed in greater detail in relation to FIG. 4. After ranking the titles, the process proceeds from step 310 to step 312 where the playback system 200 decides whether to store the title information, with the title information including objects which process data related to the title. The title information storage process is explained in greater detail in relation to FIG. 5. Generally, title set up information is cached if there is room in the cache, after lower-ranking titles are purged from cache, if necessary. If the decision is made not to store the title information, the process proceeds from step 312 to finish in step 316. On the other hand, if the decision is made to store the title information the process proceeds from step 312 to step 314, where the title information, including set up information and objects associated with the title, are stored in the cache. After storing the title information in the title cache 207 in step 314, the process proceeds to finish in step 316. Any time playback is transferred from one title to another, the title cache 207 is examined to determine whether the new title's set up information and objects required to process the title's content is located within the title cache 207. If the title information is located within the title cache 207, the information is retrieved from the title cache 207, rather than going back out to the DVD disc itself, thereby greatly increasing the speed with which titles may be transferred.

Figure 4:
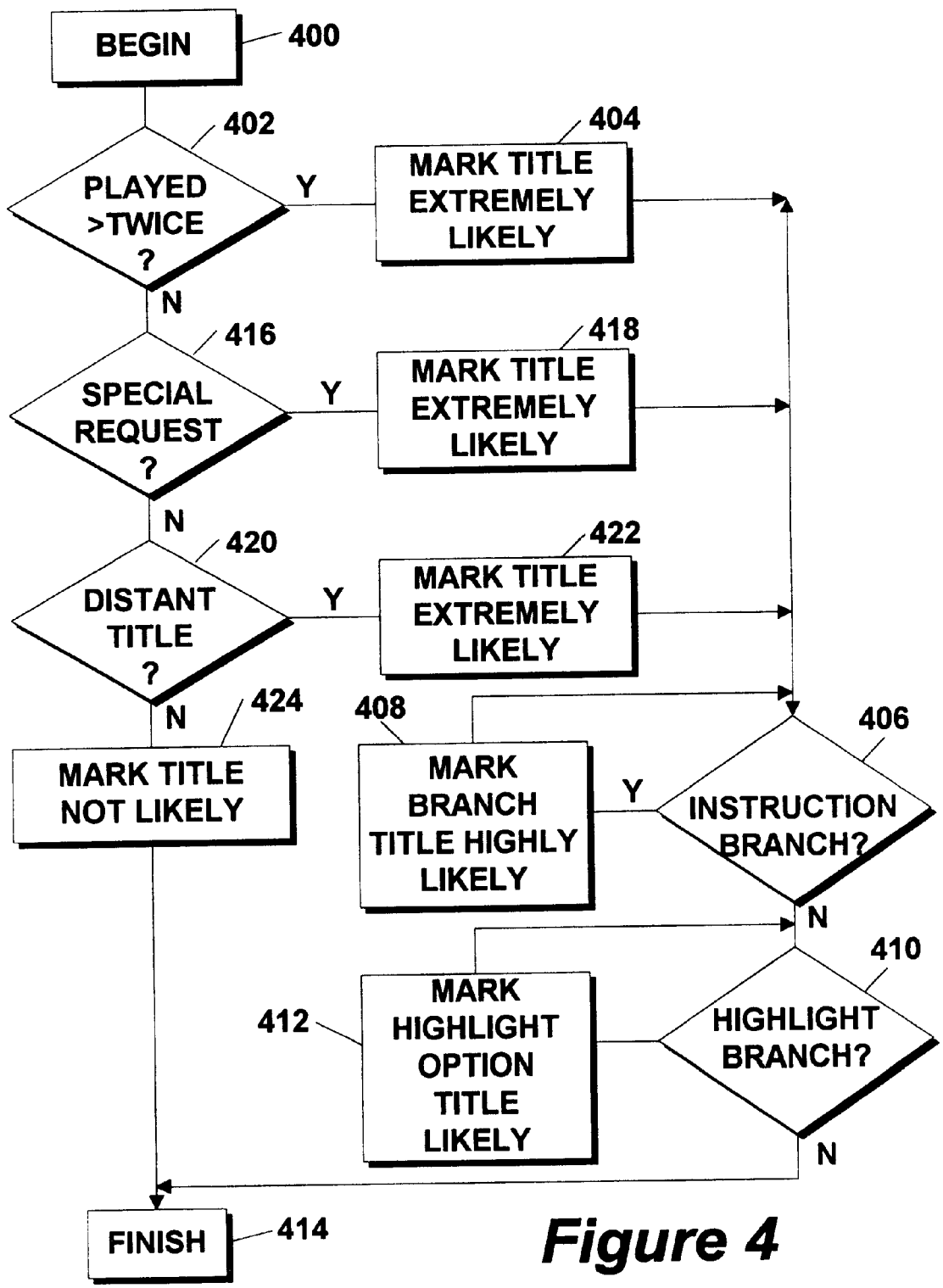
FIG. 4 is a flowchart of the title ranking process in accordance with the principles of the invention.

The process of ranking a title's likelihood of being played is set forth in greater detail in the flow diagram of FIG. 4. The process begins at step 400 and proceeds from there to step 402. In step 402 the history of the title's usage by the current user in the current DVD disc playback session is examined. If the title has been played more than a threshold number of times, the title is ranked as being extremely likely to be played again. In the illustrative embodiment the threshold level is set at two plays, because this generally indicates that the title is located within a playback loop and is extremely likely to be played again. If the title has been played more than the threshold number of times, the process proceeds from step 402 to step 404 where the title is given the highest ranking, an "extremely likely" ranking in the illustrative embodiment. From step 404 the process proceeds to step 406, where navigation instructions associated with the title, instructions executed during phases of title playback, are examined. All instructions in the current title which may branch to a different title are examined and, if a title is the target of a potential branch, the process proceeds to step 408 where the potential target title is given the second highest title ranking, that of "highly likely" to be played in the illustrative embodiment. From step 408 the process returns to step 406 and continues processing titles to which the current title may branch in this manner, until all such potential branch titles have been labeled highly likely.

When there are no more potential branch titles to be labeled in this manner, the process proceeds to step 410. Highlight information, which may, for example, offer display options to a DVD user, is typically included within a title's setup information. In step 410 highlight information is processed and the DVD player determines whether there are titles that a user may transfer to as a highlight option. If there is a title that a user may transfer to under a highlight option, the process proceeds to step 412 where the title is given a third-highest ranking, a "likely" ranking in the illustrative embodiment of the invention. From step 412 the process returns to step 410 and the process proceeds in this manner until all titles that may be branched to as a result of a highlight information option, are thus labeled. The process then proceeds to finish in step 414.

If, in step 402, it is determined that the current title has not been played more than the threshold number of times, the process proceeds to step 416 where the DVD player 402 determines whether the current title was specifically requested by the user. Since a title may be played for reasons other than a specific user request, for example, if the title was branched to, a specific user request is considered to be an indication of particular desirability and the current title is therefore given the highest ranking, that of "extremely likely" to be played again. Therefore, if the current title was specifically requested by the user, the process proceeds to step 418, where the title is labeled as "extremely likely". From step 418 the process proceeds to step 406, where the process proceeds as previously described.

If, in step 416, it is determined that the current title was not specifically requested by the user, the process proceeds to step 420. In step 420 the current title's proximity to previously played titles is determined. If the current title is a considerable distance from previously played titles, the process proceeds to step 422, where the current title is given a second highest rank, that of "highly likely", for caching. In this context, "distance between titles" refers to the time required to access one title on a DVD disc from another title. This distance is not necessarily directly related to physical proximity on the DVD disc. Such "distant" titles are ranked relatively highly for the purpose of caching in order to circumvent time-consuming disc accesses. From step 422 the process proceeds to step 406 and on from there, as previously described.

If the DVD playback system 200 determines in step 420 that the current title is not "distant" from previously played titles, the title will have been determined to have been played less than the threshold number of times, to not have been played in response to a specific user request, and to be in relative close proximity to other titles that have been played, such determinations made in steps 402, 416, and 420, respectively. Consequently, the title is assigned the lowest possible ranking for caching, i. e. "not likely". After ranking the title in step 424, the process proceeds to finish in step 414.

Note that titles processed in step 424, that is, those titles which are least likely to be played again, do not have titles to which they may branch or titles which may be related to their highlight information ranked as highly likely or likely to be played, as determined in step 408 or step 412, respectively. Otherwise, titles to which a "not likely" title may branch would be assigned a higher ranking than a title referenced in the highlight information of an "extremely likely" or "highly likely" title.

Additionally, previously ranked titles that have been ranked "extremely likely" or "highly likely" will not have their rankings downgraded in steps 406 through 412. For example, should a title, by virtue of the fact that it has been specifically requested or because it has been played more than the threshold number of times, be ranked "extremely likely", its ranking will not be lowered to "likely" in step 412 simply because a subsequent title's highlight information references it.

Figure 5:
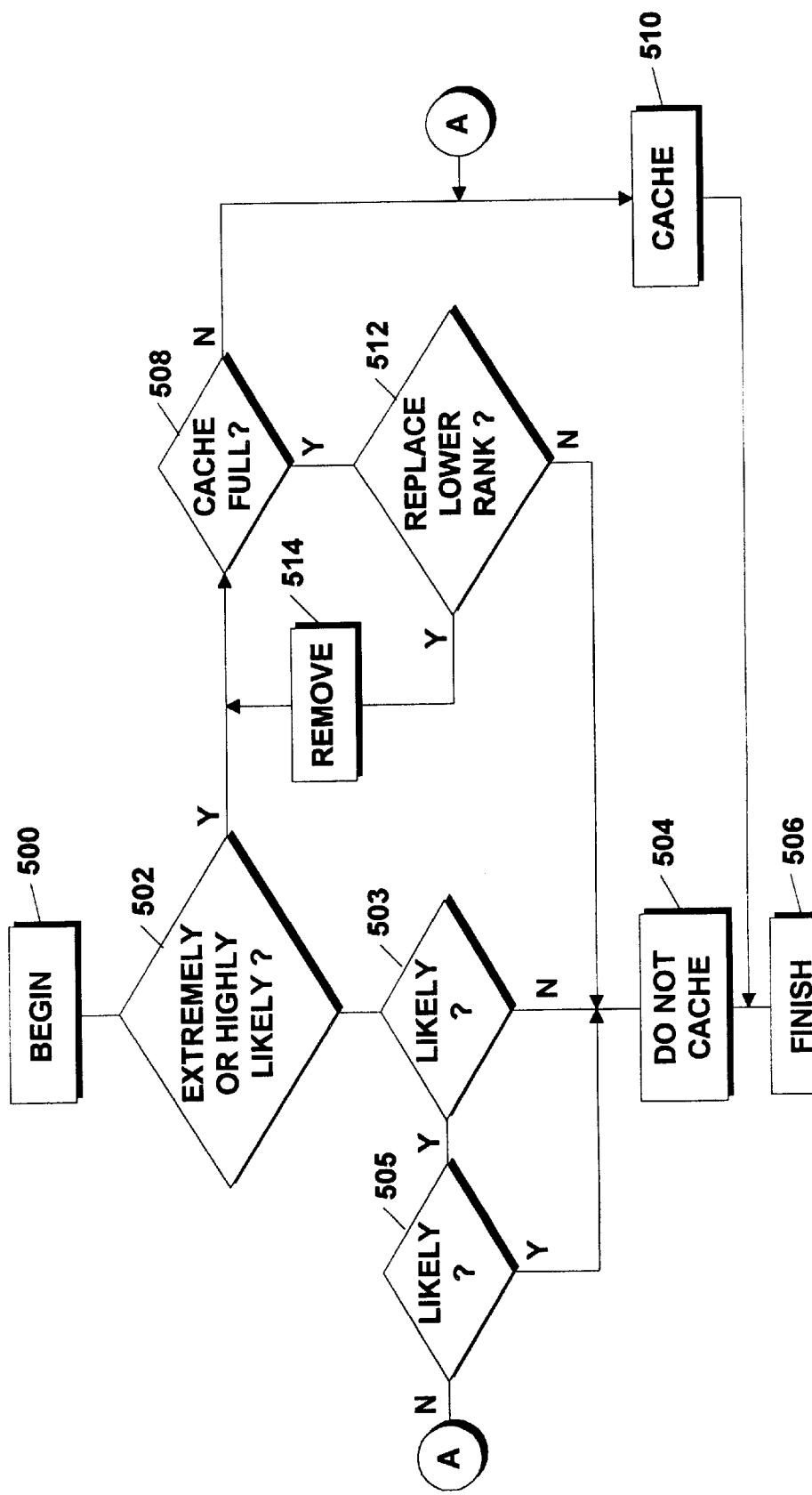
FIG. 5 is a flowchart which illustrates the storage of title information that has been ranked in accordance with the principles of the invention.

The process of storing titles is set forth in greater detail in the flow diagram of FIG. 5 which begins in step 500 and proceeds to step 502. In step 502 the player 200 determines whether or not the current title is ranked "extremely likely" or "highly likely". If the title is ranked neither "extremely highly" or "highly likely", the process proceeds from step 502 to step 503. In step 505, the player 200 determines whether the title is ranked "likely" and, if the title is ranked likely, the process proceeds from step 503 to step 505, where player 200 determines whether or not the title cache 207 is full. If the title cache 207 is not full, the process proceeds to step 510 where the title information is cached. From step 510 the process proceeds to finish in step 506.

On the other hand, if, in step 505, the player 200 determines that the cache is full or, in step 503, the player determines that the title is ranked not "likely", the process proceeds to step 504, where the title information, although retained for present use, is not cached. From step 504 the process proceeds to finish in step 506. If, in step 502, the player 200 determines that the title is ranked either "extremely likely" or "highly likely", the process proceeds to step 508 where the player 200 determines whether or not the title cache 207 is full. The title cache 207 may include title information and associated title rankings. Additionally, the physical implementation of the title cache 207 may be in a high-speed storage medium, such as on-chip cache that may be physically incorporated on a microprocessor that forms a CPU 105, within system RAM 110, or other high-speed storage media. The title information, including title set up information, title ranking information, may be stored within separate "bins" within the cache 207, each associated with one of the four title preference ranks. An index which functions to locate any one of the bins could be implemented using only two bits. Alternatively, particularly if a relatively low number of titles are contained on a DVD disc, the title information may be dispersed throughout the cache, with higher ranking title information stored adjacent to lower ranking title information. Caches are well known in the art and many techniques may be employed to indicate whether the cache is "full" or not. For example, a simple counter mechanism may be employed to indicate the extent to which the title cache 207 is loaded.

If the title cache 207 is not full, the process proceeds to step 510, where the title is cached, and from there, to finish in step 506. If, on the other hand, the player 200 determines in step 508 that the title cache 207 is full, the process proceeds to step 512. In step 512, the player 200 determines whether a title of lower rank than the current title may be replaced in the title cache 207. If no title of lower rank may be replaced, the process proceeds from step 512 to step 504 where the title information is discarded, that is, not cached. From step 504 the process proceeds to finish in step 506. If the player 200 determines in step 512 that a title of lower rank may be replaced, the lower ranking title's information is removed from the title cache 207 in step 514. The process proceeds from step 514 to step 508 and from step 508 as previously described.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Further, such modifications to the inventive concept are intended to be covered by the appended claims.

What is claimed is:

1. An apparatus for use with a system having a memory and capable of playback of one or more titles, each title having associated therewith setup information useful in playback of data including the title, the apparatus comprising:

program logic configured to read the setup information associated with a selected title;

program logic configured to rank the setup information associated with the selected title in accordance with predetermined criteria including the number of times the selected title has been played; and program logic, responsive to the program logic configured to rank the setup information, and configured to store, in the memory, the setup information of the selected title according to the rank associated with the setup information.

2. The apparatus of claim 1 wherein the predetermined criteria further comprises whether a specific request for the selected title was received.

3. The apparatus of claim 1 wherein the predetermined criteria further comprises the proximity of the selected title with another title.

4. The apparatus of claim 1 wherein the predetermined criteria further comprises whether the selected title is a highlight option.

5. The apparatus of claim 1 wherein the predetermined criteria further comprises whether a selected title is a possible playback branch from another title.

6. The apparatus of claim 1 wherein the setup information further comprises object descriptions necessary for playback of data including a title and wherein the apparatus further comprises:

program logic, responsive to the setup information, and configured to create at least one object useful in playback of the data including the selected title.

7. In system having a memory and capable of playback of one or more titles, each title having associated therewith setup information useful in playback of data including the title, a method for reducing the access time to setup information, comprising:

reading the setup information associated with a selected title;

ranking the setup information according to predetermined criteria including the number of times the selected title has been played; and storing the setup information in memory in accordance with the step of ranking, with the setup information associated with a higher ranking title receiving storage priority over title information associated with a lower ranking title.

8. The method of claim 7 wherein the predetermined criteria further comprises whether a specific request for the selected title was received.

9. The method of claim 7 wherein the predetermined criteria further comprises the proximity of the selected title with another title.

10. The method of claim 7 wherein the predetermined criteria further comprises whether the selected title is a highlight option.

11. The method of claim 7 wherein the predetermined criteria further comprises whether a selected title is a possible playback branch from another title.

12. The method of claim 7 wherein the setup information further includes object descriptions necessary for playback of data including a title and wherein the method further comprises:

creating, from the setup information of the selected title, at least one object useful in playback of the data comprising the selected title.

13. A computer program product for use with a system having a memory and capable of playback of one or more titles, each title having associated therewith setup information useful in playback of data including the title, the computer program product including a computer usable medium having computer readable program code embodied thereon, the program code comprising:

program code configured to read the setup information associated with a selected title;

program code configured to rank the setup information associated with the selected title in accordance with predetermined criteria including the number of times the selected title has been played; and program code, responsive to the program code configured to rank the setup information, and configured to store, in the memory, the setup information of the selected title according to the rank associated with the setup information.

14. The computer program product of claim 13 wherein the predetermined criteria further comprises whether a specific request for the selected title was received.

15. The computer program product of claim 13 wherein the predetermined criteria further comprises the proximity of the selected title with another title.

16. The computer program product of claim 13 wherein the predetermined criteria further comprises whether the selected title is a highlight option.

17. The computer program product of claim 13 wherein the predetermined criteria further comprises whether a selected title is a possible playback branch from another title.

18. The computer program product of claim 13 wherein the setup information further comprises object descriptions necessary for playback of data including a title and wherein the computer program product further comprises:

program code, responsive to the setup information, and configured to create at least one object useful in playback of the data comprising the selected title.

* * * * *